United States Patent
Jeske et al.

(10) Patent No.: US 9,282,139 B2
(45) Date of Patent: Mar. 8, 2016

(54) GRAPHICAL USER INTERFACE FOR FACILITATING ACCESS TO ONLINE GROUPS

(71) Applicant: Google Inc., Mountain View, CA (US)

(72) Inventors: David Jeske, San Francisco, CA (US); Gaku Ueda, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 376 days.

(21) Appl. No.: 13/857,106

(22) Filed: Apr. 4, 2013

(65) Prior Publication Data

US 2013/0218957 A1  Aug. 22, 2013

Related U.S. Application Data

(63) Continuation of application No. 10/949,441, filed on Sep. 24, 2004, now abandoned.

(60) Provisional application No. 60/570,263, filed on May 11, 2004.

(51) Int. Cl.
*G06F 3/00* (2006.01)
*H04L 29/08* (2006.01)

(52) U.S. Cl.
CPC ................ *H04L 67/02* (2013.01); *H04L 67/36* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 6,480,885 B1 | 11/2002 | Olivier | |
| 7,028,261 B2 * | 4/2006 | Smyth et al. | 715/744 |
| 7,203,909 B1 * | 4/2007 | Horvitz et al. | 715/765 |
| 2002/0138588 A1 | 9/2002 | Leeds | |
| 2002/0186239 A1 * | 12/2002 | Komuro | 345/738 |
| 2003/0074400 A1 | 4/2003 | Brooks et al. | |
| 2003/0090516 A1 * | 5/2003 | Stein | 345/745 |
| 2003/0154248 A1 | 8/2003 | Smith et al. | |
| 2005/0028104 A1 * | 2/2005 | Apparao et al. | 715/738 |
| 2009/0030998 A1 * | 1/2009 | Blagsvedt et al. | 709/206 |

OTHER PUBLICATIONS

Google Inc., ISR, PCT/US2005/013106, Jun. 28, 2005, 4 PGS.

* cited by examiner

*Primary Examiner* — Anil N Kumar
(74) *Attorney, Agent, or Firm* — Morgan, Lewis & Bockius LLP

(57) ABSTRACT

Methods, systems, and graphical user interfaces that automatically personalize and prioritize links to online groups are disclosed. A server automatically generates a set of prioritized links to online groups based at least in part on a computer user's browsing patterns with respect to online groups and sends these links to a client for display in a navigation region in a graphical user interface.

12 Claims, 5 Drawing Sheets

GRAPHICAL USER INTERFACE FOR FACILITATING ACCESS TO ONLINE GROUPS

RELATED APPLICATIONS

This application is a continuation of U.S. application Ser. No. 10/949,441, filed Sep. 24, 2004, which claims priority to U.S. Provisional Patent Application No. 60/570,263, filed May 11, 2004, which are incorporated by reference herein in their entirety.

TECHNICAL FIELD

The disclosed embodiments relate generally to interfaces for facilitating access to online groups. More particularly, the disclosed embodiments relate to methods, systems, and graphical user interfaces for automatically personalizing and prioritizing links to Internet groups, such as Usenet groups and other groups visited by a computer user.

BACKGROUND

Online groups (e.g., groups found in Google Groups, AOL Groups, MSN Groups, Yahoo! Groups, Usenet, and other online user groups and message boards) are increasing in popularity and use as the number of computer users continues to grow. However, as users create and/or visit more groups, it becomes increasingly cumbersome for such users to keep track of and easily return to the groups that interest them.

At present, some web sites create a list of all the groups that a user has joined. For example My Groups at Yahoo! Groups creates a list of all the groups that a user belongs to in Yahoo! Groups, lets the user manually rank order these groups, and displays a list with links to the top 25 groups chosen by the user. However, a Yahoo! Groups user must manually adjust and maintain his top 25 list as his interests change over time. Moreover, a user's top 25 list is only present on his Yahoo! Groups front page and there is nothing to indicate which groups in his top 25 have had activity (e.g., new listings, postings, or other messages) since his last visit.

SUMMARY

The present invention overcomes the limitations and disadvantages described above by providing methods, systems, and graphical user interfaces that automatically personalize and prioritize links to online groups.

One aspect of the invention involves a computer-implemented method that automatically generates a set of prioritized links to online groups based at least in part on a computer user's browsing patterns with respect to online groups, and sends the set of links to a computer for display in a graphical user interface.

Another aspect of the invention involves a computer-implemented method that receives a set of prioritized links to online groups for a computer user, and displays the set of links in a graphical user interface. The set of prioritized links are automatically generated by a remote computer based at least in part on the computer user's browsing patterns with respect to online groups.

Another aspect of the invention involves a system with at least one server configured to automatically generate a set of prioritized links to online groups based at least in part on a computer user's browsing patterns with respect to online groups, and send the set of links to a computer for display in a graphical user interface.

Another aspect of the invention involves a graphical user interface on a computer with a set of prioritized links to online groups for a computer user. The set of links are automatically generated by a remote computer based at least in part on the computer user's browsing patterns with respect to online groups.

Another aspect of the invention involves a machine readable medium having stored thereon data representing sequences of instructions, which when executed by a server, cause the server to automatically generate a set of prioritized links to online groups based at least in part on a computer user's browsing patterns with respect to online groups, and send the set of links to a computer for display in a graphical user interface.

Another aspect of the invention involves a machine readable medium having stored thereon data representing sequences of instructions, which when executed by a client, cause the client to receive a set of prioritized links to online groups for a computer user, and display the set of links in a graphical user interface. The set of prioritized links are automatically generated by a remote computer based at least in part on the computer user's browsing patterns with respect to online groups.

BRIEF DESCRIPTION OF THE DRAWINGS

Like reference numbers refer to corresponding parts throughout the drawings.

DESCRIPTION OF EMBODIMENTS

Methods, systems, and graphical user interfaces are described that automatically personalize and prioritize links to online groups. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
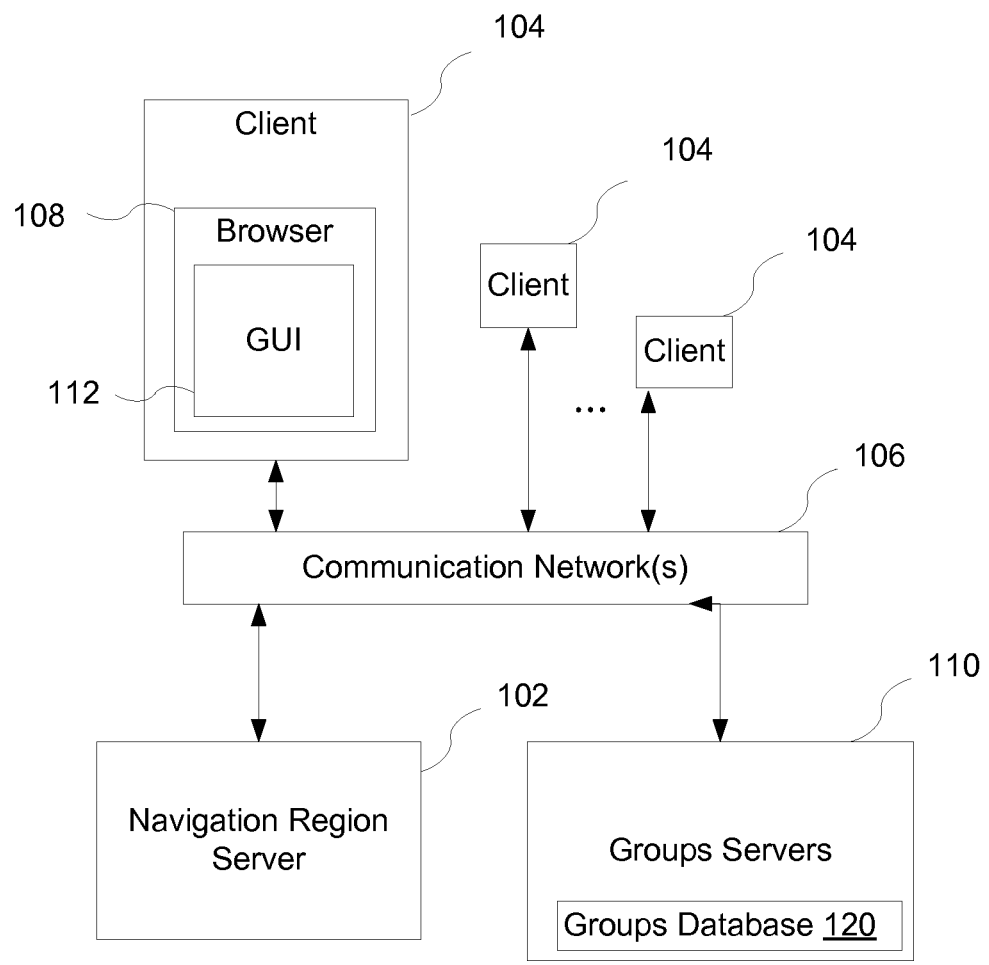
FIG. 1 is a block diagram illustrating an exemplary communications system.

FIG. 1 is a block diagram illustrating an exemplary communications system. This system includes clients 104, Navigation Region Server 102, Groups Servers 110, and communication network(s) 106 for interconnecting these components. Client 104 includes browser 108 with graphical user interface (GUI) 112. Navigation Region Server 102 automatically generates a set of prioritized links to online groups based, at least in part, on a computer user's browsing patterns with respect to online groups and sends these links to client 104 for display in a navigation region in GUI 112. Groups Servers 110 send, receive and store data about online groups. Communications network(s) 106 may include the Internet and may also include one or more local area networks and/or wide area networks, and need not be described in detail because such networks are well known to those of ordinary skill in the art.

In some embodiments, Navigation Region Server 102 is implemented using a plurality of computers servers or processors. For instance, in a system that provides online groups services for millions of users throughout the world, a distinct set of one or more Navigation Regions Servers may be used to provide services to users in each of several distinct geographic regions of the world. In some embodiments, one or more of the Navigation Region Servers 102 may also be used as one of the Groups Servers 110.

In some embodiments, the Groups Servers 110 include at least one server having a groups database 120, which responds to queries from the navigation region server 102 by providing the highest message numbers for specified groups. In one embodiment, the groups database 120 includes a cache in which the highest message number is stored for all online groups serviced by the groups servers 110. The information in the cache is updated periodically, and queries from the navigation region server 102 requesting the highest message number for any specified group, or set of groups, are answered by providing information currently stored in the cache.

Figure 2:
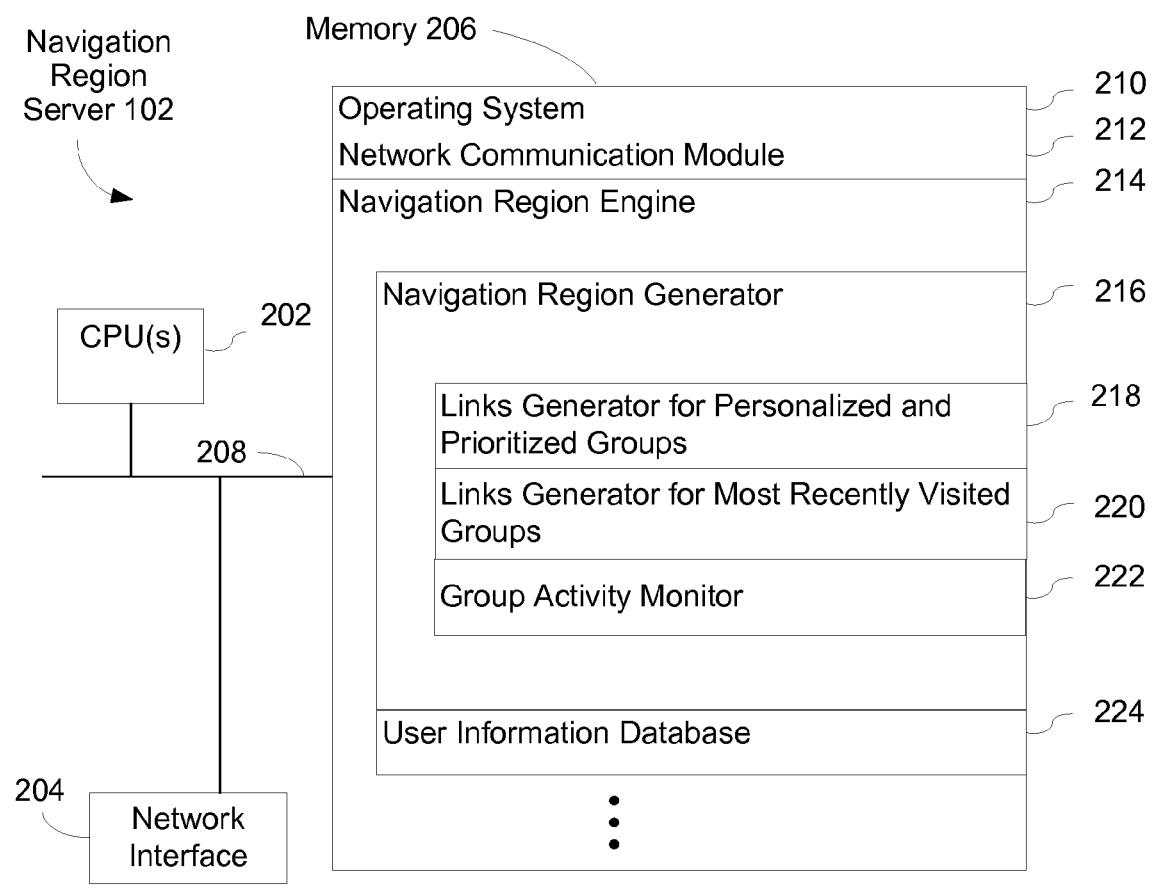
FIG. 2 is a block diagram illustrating an embodiment of Navigation Region Server 102.

FIG. 2 is a block diagram illustrating an embodiment of Navigation Region Server 102. Navigation Region Server 102 generally includes one or more processing units (CPU's) 202, one or more network or other communication interfaces 204, memory 206, and one or more communication buses 208 for interconnecting these components.

Memory 206 may include high-speed random access memory and may also include non-volatile memory, such as one or more magnetic disk storage devices. Memory 206 may include mass storage that is remotely located from the central processing unit(s) 202.

In one embodiment, memory 206 stores operating system 210, network communication module 212, and Navigation Region Engine 214. Operating system 210 (e.g., LINUX, UNIX, or WINDOWS) includes procedures for handling basic system services and for performing hardware dependent tasks. Network communication module 212 is used for communicating with Groups Servers 110 and clients 104.

Navigation Region Engine 214 includes Navigation Region Generator 216 and user information database 224. In one embodiment, Navigation Region Generator 216 includes group activity monitor 222, links generator for personalized and prioritized groups 218, and links generator for most recently visited groups 220. Group activity monitor 222 determines whether there has been activity (e.g., new postings) in online groups previously visited by a particular computer user since that user's last visit. In one embodiment, the monitoring of online groups previously visited can be limited to the online groups to which the user has subscribed. In another embodiment, the monitoring of online groups includes both groups to which the user has subscribed as well as other groups that the user has visited. For either embodiment, the online groups monitored on behalf of a particular user are herein called "the monitored online groups" or "the user's monitored online groups." For monitored online groups that have had activity since the user's last visit, group activity monitor 222 determines the amount of that activity (e.g., the number of new postings since the user's last visit).

Links generator 218 uses information from group activity monitor 222 and user information database 224 to automatically generate a prioritized set of links to online groups for a particular user based on that user's browsing habits. Links generator 218 generates links based on an analysis of a particular user's browsing patterns with respect to online groups (e.g., whether or not a user consistently visits a group when the user receives an indication that there are new listings posted to that group), whereas links generator 220 generates links to the groups most recently visited by a particular computer user. More specifically, links generator 220 automatically generates links to the online groups most recently visited by a particular user, excluding the online groups for which links are generated by links generator 218. Determining the most recently visited online groups (for a specific user) for which links are to be generated is accomplished, as described below, by accessing the user information database 224.

Although FIG. 2 shows Navigation Region Server 102 as a number of discrete items, FIG. 2 is intended more as a functional description of the various features which may be present in Navigation Region Server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in Navigation Region Server 102 and how features are allocated among them will vary from one implementation to another, and may depend in part on the amount of data traffic that the system must handle during peak usage periods as well as during average usage periods.

FIGS. 3A-3D are block diagrams illustrating an embodiment of user information database 224 in greater detail.

Figure 3A:
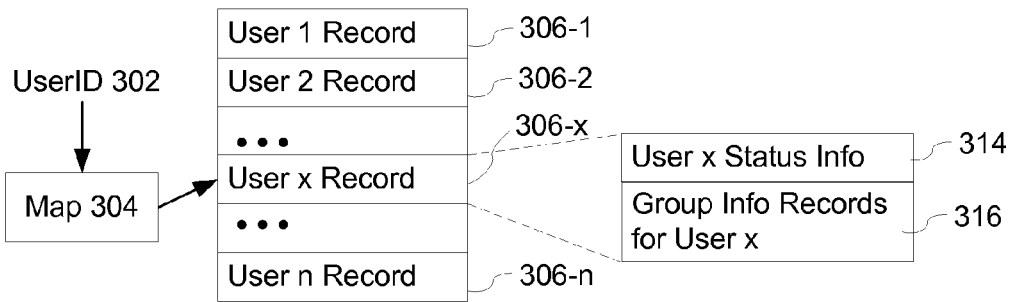
FIGS. 3A-3D are block diagrams illustrating an embodiment of user information database 224 in greater detail.

FIG. 3A is a block diagram illustrating that user information database 224 includes map 304 and user records 306. Map 304 is used to access the record of a particular user based on the corresponding UserID 302 for that user. In some embodiments, the UserID is the user's screen name or a unique identifier for the user. The UserID may be obtained (e.g., from a user database) when the user logs in, or from a cookie on the user's computer. User records 306 include records for a plurality of users (user 1, user 2, . . . user x, . . . , user n). Each user record 306 includes user status information 314 and group information records 316 for the user.

Figure 3B:
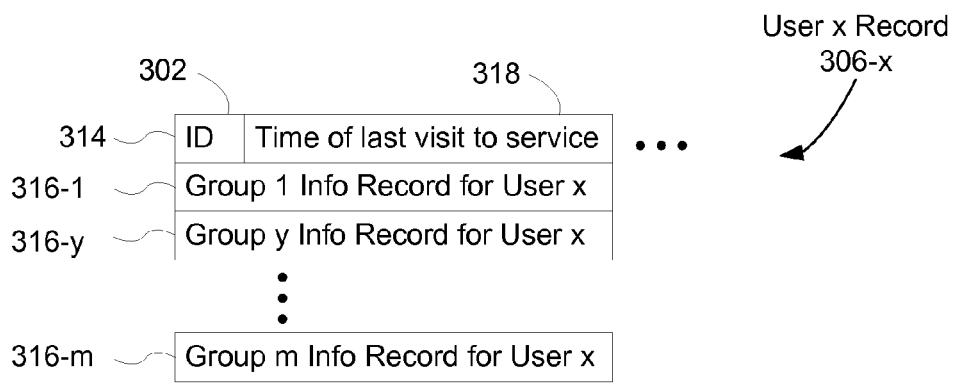

FIG. 3B is a block diagram illustrating exemplary user x record 306-x in more detail. User x status information 314 includes the User ID 302, and time of last visit to service 318 (i.e., the time user x last accessed or tried to access online groups). Group information records 316 for user x includes group information records for all the groups to which the user has subscribed as well as other groups, if any, that the user has visited. In some embodiments, the number of records 316 used to store information about the visited groups to which the user is not subscribed may be limited to a predefined number of such records. For example, if links to no more than D (e.g., five, or ten) such groups will be displayed to the user, then no more than D such records need be maintained.

Figure 3C:
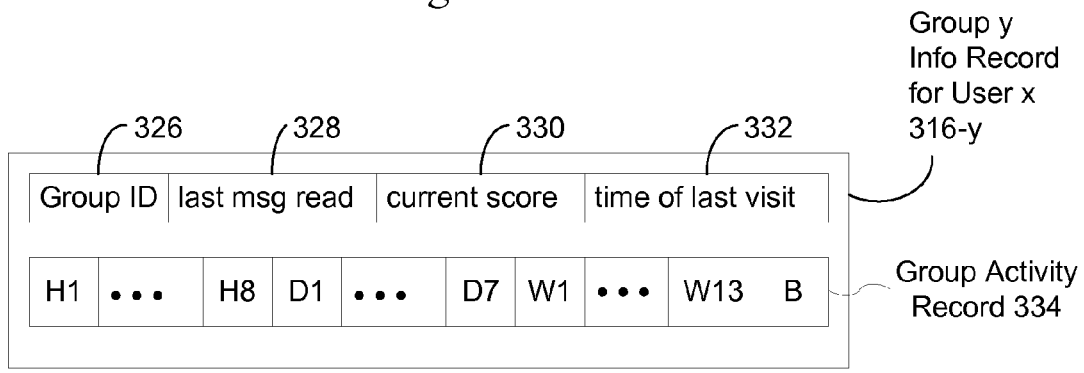

FIG. 3C is a block diagram illustrating exemplary group y information record 316-y for user x in more detail. Record 316-y includes group ID 326, last message read 328, current score 330, time of last visit 332, and group activity record 334. Group ID 326 identifies an online group previously visited by user x. In one embodiment, group ID 326 identifies an online group to which user x has subscribed. Last message read 328 is an identifier, index or pointer that identifies the most recent message (e.g., the message having the highest message ID) in the online group with group ID 326 that was viewed by user x. In some embodiments, the messages for a group are assigned monotonically increasing numbers, which may be considered to be message ID's. The last message read 328 identifies the group's highest number message at the time the user last visited the group, regardless of whether the user read or viewed that message. Current score 330 is used to determine whether (and where) a link to online group with group ID 326 will appear in the navigation region in GUI 112. The computation of current score 330 is discussed below. Time of last visit 332 is a time stamp indicating the last time that user x visited the online group with group ID 326.

In some embodiments, the current score 330 is not durably stored as part of the group information record 316-*y*, and is only maintained while the user is logged in. Further, in some embodiments, the message ID of the last message read and the time of the last visit 332 for both the current visit and for the previous visit are both stored in the group information record 316-*y*.

Group activity record 334 contains an array that stores activity scoring information for the online group with group ID 326 as a function of time. In one embodiment, the record 334 includes a number of sequentially arranged buckets that store the activity data for this group over progressively longer and progressively more remote time periods. For example, the first eight buckets (H1-H8) store activity data for this group over a sequence of three hour periods, while later buckets store activity data over several days (D1-D7) and weeks (W1-W13), or other predefined, progressively longer time periods, with a final bottom (B) bucket for the oldest activity scoring information. The number of buckets in record 334, and the time periods associated with each such bucket, may vary from one embodiment to another. The time periods associated with each bucket are time periods relative to a defined start time. In one embodiment, the buckets in record 334 are all assigned timestamps when the user first subscribes to the online group, or first uses the groups service to access the group. The timestamp for each bucket indicates the beginning of the time period for which the scoring information in the bucket. Thus, all the bucket timestamps identify times in the past, with each successive buckets in record 334 having an "older" timestamp than the preceding bucket. For example, the timestamps for the buckets in an exemplary group activity record might be:

T1: 5/11/2004, 11 AM
T2: 5/11/2004, 8 AM
. . .
T8: 5/10/2004, 2 PM
D1: 5/10/2004, 11 AM
D2: 5/09/2004, 11 AM
. . .
D7: 5/03/2004, 11 AM
W1: 4/26/2004, 11 AM
. . .
W13: 2/2/2004, 11 AM
B: 11/3/2003, 11 AM

The information stored in each bucket, other than the first bucket, is a score value, and a corresponding timestamp. The information stored in the first bucket comprises two flags: an activity flag, indicating whether any new activity (e.g., new postings) have occurred in the group in the corresponding period, and a visit flag, indicating whether the user has visited the corresponding online group during the corresponding period. When the user first logs onto the online groups service, the activity flag is set for each group that has had new activity since the last time the user visited that group. Furthermore, while the user remains logged into the online groups service, the activity flag will be set for any group that experiences new activity during that time period, and the visit flag will be set for each online group that the user visits. The computation and updating of the scores stored in the group activity record 334 are discussed below.

Figure 3D:
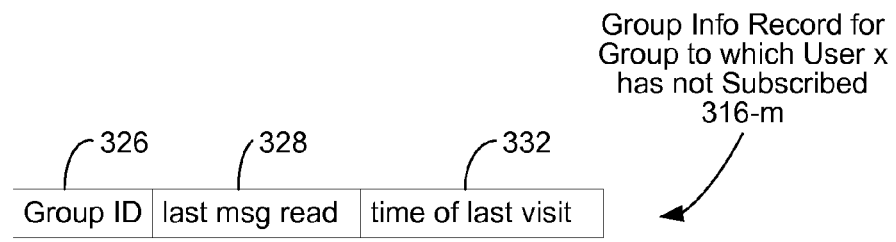

FIG. 3D shows the group information record 316-*m* for an online group to which the user has not subscribed. In some embodiments, less information is stored in the user records 306 for groups visited by the user, but to which the user has not subscribed. In particular, the information retained for such groups includes the time of the last visit to the group by the user 332 and optionally includes the identity of the last message read 328 by the user. The time of the last visit 332 is needed for determining which online groups are the ones most recently visited by the user. The identity of last message read 328 is optionally stored in record 316-*m*, and can be used, in conjunction with information obtained from the respective online group, to determine the number of new messages added to the online group after the last message read by the user. In some embodiments, the identity of the last message read 328 is not included in the group information record 316-*m* for an online group that the user has visited, but to which the user has not subscribed. In some embodiments, the group information record 316-*m* for such an online group does not include a group activity record 334 because the set of online groups most recently visited by the user tends to change over time, making the storage or historical group activity and user visits activity of little use.

Figure 4:
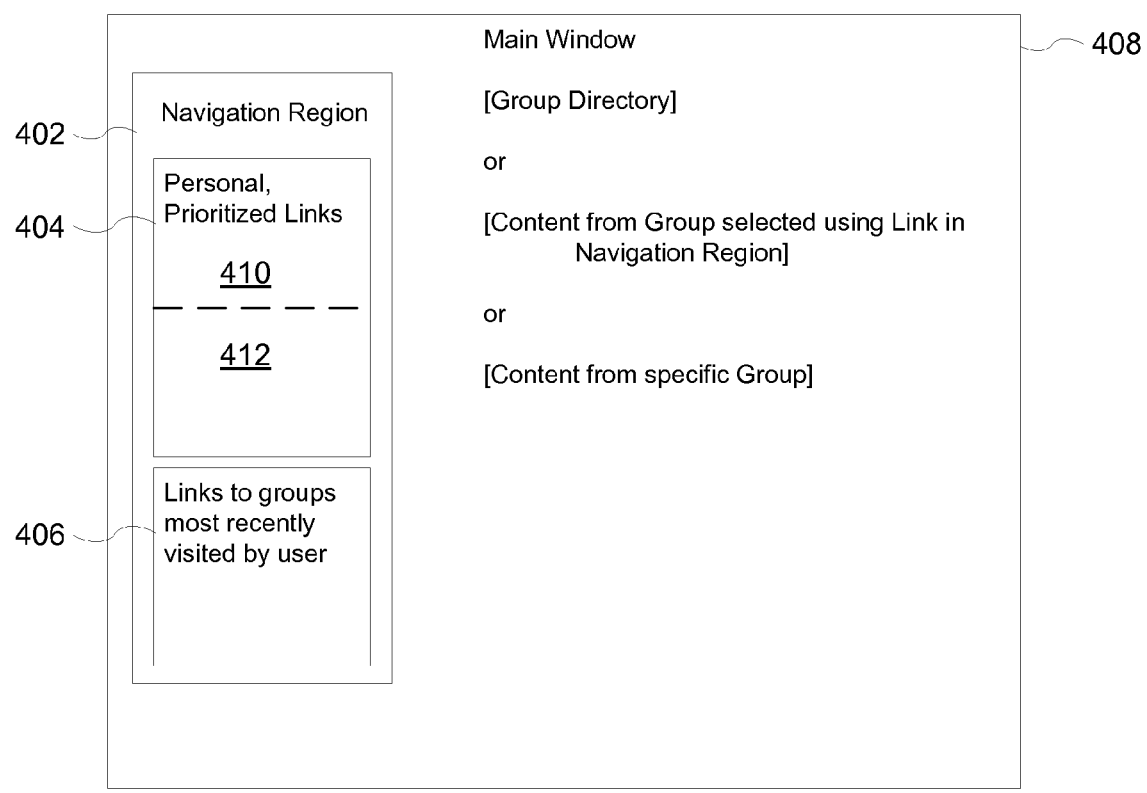
FIG. 4 is a diagram illustrating an exemplary graphical user interface 112.

FIG. 4 is a diagram illustrating an exemplary graphical user interface (GUI) 112. GUI 112 includes Navigation Region 402 and main window 408. Navigation Region 402 displays personal (i.e., for a particular user), prioritized links 404 to online groups that are automatically generated by and received from Navigation Region Server 102. Prioritized links 404 are personal because they are based, at least in part, on the particular computer user's browsing habits with respect to online groups. Navigation Region 402 can be a bar, panel, palette, or other similar area in GUI 112.

In one embodiment, indicia of activity can also be automatically generated and displayed in Navigation Region 402 within or beside links for groups that have had activity since a previous visit by the user. For example, a number in parentheses [e.g., "(3)"] within or beside a link can indicate the number of new postings in the corresponding group since a previous visit by the user. Alternatively, the indicia of activity can be a non-numeric symbol that indicates a level of activity since a last visit to the online group by the user. For example, the level of activity may be indicated by a font color or by highlighting the links to the most active groups, or by a variable number of instances of a symbol (e.g., one, two or three stars or the like), and so on.

In one embodiment, Navigation Region 402 also displays links 406 to groups most recently visited by the user. In some embodiments, the links 406 to recently visited groups do not include any of the links in the prioritized links 404.

In some embodiments, the prioritized links 404 are divided into two groups 410, 412. The first group 410 of prioritized links are links to groups most consistently visited by the user. The second group 412 of prioritized links are links to groups to which the user has subscribed and that have the most new postings since a last visit by the user. The second group 412 of prioritized links does not include links to the groups for which links are included in the first group 410.

Main window 408 displays a variety of different content (e.g., an online group directory, content from a group selected using a link in Navigation Region 402, or content from a specific group). In one embodiment, Navigation Region 402 remains visible in GUI 112 as the user visits various online groups in main window 408.

Figure 5:
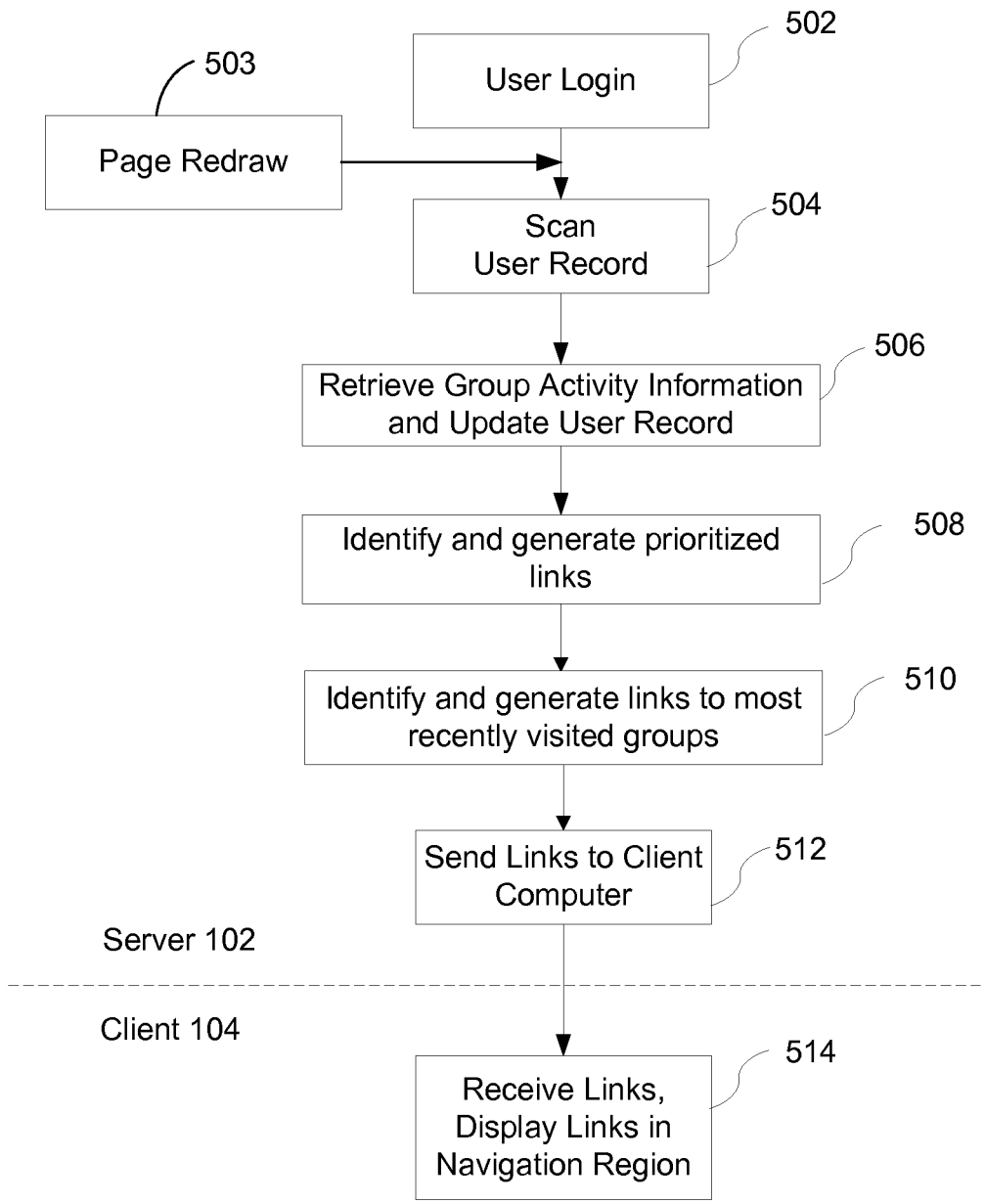
FIG. 5 is a flow chart of an exemplary process for automatically personalizing and prioritizing links to online groups.

FIG. 5 is a flow chart of an exemplary process for automatically personalizing and prioritizing links to online groups. The process shown in FIG. 5 is performed by the Navigation Region Server 102 (FIG. 1). It will be appreciated by those of ordinary skill in the art that one or more of the acts described may be performed by hardware, software, or a combination thereof, as may be embodied in one or more computing systems.

At 502, a user logs in to the system. In some embodiments, the user enters a UserID 302 and a password into client 104. Alternatively, the user can automatically login via a cookie stored in client 104. In some embodiments, the method shown in FIG. 5 is also initiated whenever a page redraw operation is performed (503), for instance because the user has selected a new group to view.

At 504, the user's user record (e.g., user x record 306-x) is scanned. In some embodiments, Navigation Region Engine 214 scans the group information records 316 for user x for the group IDs (e.g., group ID 326) of online groups subscribed to by user x or previously visited by user x.

At 506, group activity information is retrieved for the groups previously visited by the user. In some cases, this information is just retrieved for the online groups to which the user has subscribed. In some embodiments, group activity monitor 222 determines from the group information records 316 the identify of last message read 328 for each of the groups represented by the group information records 316 in the user record 306 for user x. Group activity monitor 222 sends queries to groups servers 110 to determine the number of new postings since the last message read 328 for each of these groups. Group activity monitor 222 also updates the group activity records 334 in the group information records 316 for user x.

In some other embodiments, instead of basing the determination of new activity on the identity of the last message read 328 for each of the groups represented by the records 316, the new activity determination is based on the time of the last visit 332 for these online groups. In this case, the group activity monitor 222 asks the groups servers 110 to determine the number of new postings since the time of the last visit to each of these online groups.

At 506, group activity information is retrieved from one or more of the group servers (see FIG. 1), and the group activity records 334 for the user are updated. In one embodiment, an activity flag is set in the group activity record of group that has at least one new message past the highest number message read or viewed by the user. In addition, a visit flag is set if the user is currently visiting the group. A pseudocode representation of the procedure for implementing 506 in one embodiment is shown in Table 1. In other embodiments, other information may be stored in the group activity records, such as the number of new messages posted during a corresponding time period, and the number of visits by the user or the number of messages read by the user.

TABLE 1

Group Information Update Procedure {
  // Execution upon each page redraw //
  Repeat for each Subscribed Group {
    Obtain highest message number for Group;

TABLE 1-continued

Compare with last message read by user;
    If new activity in Group {
      Set activity flag in Group Information Record; }
    If user is visiting Group {
      Set visit flag in Group Information Record; }
  }
}

At 508, a set of prioritized links for the user is automatically generated. The set of prioritized links is typically limited to a predefined maximum number to keep Navigation Region 402 from becoming cluttered. The prioritization is based, at least in part, on the user's browsing patterns with respect to online groups. In some embodiments, links generator 218 uses group activity records 334 to calculate a score 330 for each group represented by a group information record 316 for user x. In some embodiments, a score 330 is generated only for those online groups to which the user has subscribed. Score 330 for an online group will be higher if the user consistently visits that group after receiving an indication that there has been new activity in that group since the user's last visit. Conversely, score 330 for a group will be lower if the user rarely visits that group after receiving an indication that there has been new activity in that group since the user's last visit. In some embodiments, the score for a group is based on the frequency with which the user visits an online group during time periods in which the group has new postings. In some embodiments, the score 330 is generated using a scoring function that weights recent group activity and user visits more heavily than group activity and user visits further in the past. In other embodiments, the scoring function may take user visits to online groups and group activity into account without regard to whether the user visits take place during the same time periods as the group activity.

Numerous types of prioritization are possible. In some embodiments, links generator 218 automatically generates a set of prioritized links that correspond to those groups with the highest current scores 330, with the links listed in descending order. In other embodiments, links generator 218 can automatically generate a first set of prioritized links (see 410, FIG. 4) in which links to the online groups that are the most consistently visited by the user (i.e., the groups with the highest scores) are listed first, followed by a second set of links (412, FIG. 4) to online groups to which the user has subscribed that have had the most activity since a prior visit by the user. These latter links can be replaced or updated as the user visits the corresponding groups, thereby permitting links to other sites with activity since a prior visit to be generated, transmitted and displayed.

In some embodiments, the anchor text displayed with the prioritized links 404 include an indicia of the level of activity in the respective groups since the last visit to those groups by the user. As described above, at 506 the navigation region server retrieves group activity information. While that information is used to update the user's group information records 334, it can also be used to generate group activity indicia. In one embodiment, the indicia for a group corresponding to a prioritized link 404 is a number (e.g., surrounded by parentheses, brackets or the like) indicating the number of new postings to the group since the last visit to the group by the user. In other embodiments, other indicia of group activity level are used, as described above with reference to FIG. 4. Such indicia of group activity level may be appended to the anchor text of the second set of links 412 to online groups to which the user has subscribed that have had the most activity since a prior visit by the user. Such indicia of group activity level may be appended to the anchor text of the first set of links 410.

Exemplary Embodiment

In an exemplary embodiment, the generation and updating of scores in the group activity records 334 is accomplished as follows. A pseudocode representation of the procedures for implementing step 508 in this exemplary embodiment is shown in Tables 2 and 3. The process of generating scores and updating the information in the buckets of the group activities records is performed only when there is a new login by the user or when the user's online session has been idle for a significant period of time (e.g., 3 hours). The determination of a "new user login" takes into account the time of the last user login, which is recorded in the user record 306. For instance, if less than a threshold amount of time (e.g., an hour) has expired since the "time of last visit to service" 318 recorded in user record 306, the act of logging in does not trigger the generation of new scores. Similarly, the "time of last visit to service" 318 is not updated if the current login is less than the threshold amount of time has not expired since the time recorded in 318.

Similarly, in the exemplary embodiment, the process of identifying the online groups most consistently visited by the user, and generating links to those groups is performed only when there is a new user login or when the user's online session has been idle for a significant period of time (e.g., 3 hours). A reason for so limiting the times at which the prioritized links are regenerated is to make this portion 410 of the navigation region 402 relatively stable. Other portions of the navigation region 402 are updated more frequently.

When there is a new user login or when the user's online session has been idle for a significant period of time, the computation of scores for each group is triggered. An exemplary implementation is shown in pseudocode form in Table 3. The group activity record 334 for each subscribed group (i.e., each online group to which the user has subscribed) may be considered to have a plurality of layers: an hourly layer (the H buckets), a daily layer (the D buckets), a weekly layer (the W buckets) and a final layer (the B bucket). Whenever the scoring function is executed, the current time is compared with the ending time for each layer, starting with the last or lowest (i.e., oldest) layer. If the current time is past the ending time for a respective layer, then the scoring information from the next higher layer is combined and shifted down to the respective layer. For instance, if the current time is past the ending time for the final layer, the "NewQuarter" condition is true, the scores in all the weekly buckets (W1 to W13 in this example) are summed, added to the score in the final bucket B, and then multiplied by a scaling factor F1. The scaling factor F1 is a value between 0 and 1, such as 0.5, and preferably between 0.2 and 0.8. By multiplying the combined scores by the scaling factor F1, current group activity is weighted more heavily than group activity long in the past when the total score for the group is computed.

In the pseudocode of Table 3, the conditions NewWeek, NewDay and NewPartialDay corresponding to the current time being later than the ending time for the Week layer of buckets, the Day layer of buckets and the Hour layer of buckets, respectively. When any of the NewQuarter, NewWeek or NewDay conditions are triggered, the scoring information in the next higher layer is combined, optionally multiplied by a scaling factor (e.g., a value between 0 and 1, and preferably between 0.2 and 0.8) to reduce the weighting of those scores, and stored in a respective bucket of the corresponding layer. In addition, the scores in the higher layer are cleared, since they have already been summed and stored in the next lower layer. Also, when any of the NewWeek, NewDay or NewPartialDay conditions are triggered, the scoring and timestamp information in the corresponding layer of buckets is shifted down one bucket prior to a new score value being written into the first bucket in that layer.

When the current time is later than the ending time for the first bucket H1 (thereby triggering the NewPartialDay condition), a score is computed for the corresponding time period. In one embodiment, a score is assigned as follows. A score is 0 is assigned if the group had activity (e.g., new postings), but the user did not visit the group during that time period. A score of S1 (e.g., 1) is assigned if the group had no activity during the time period. A score of S2 (e.g., 2) is assigned if the group had activity during the time period, and the user visited the group during the time period. Visiting a group during periods in which there is no activity indicates user interest in the group, and thus is assigned a high score. When a group has no activity, failure to visit is not indicative of a lack of user interest, and thus in some embodiments the group receives a nonzero score for such time periods. In some embodiments, the score assigned for inactive periods is less than the score assigned for active periods in which the user visited the group.

After all scoring updates (if any) have been computed for a group, a score is computed by summing the scores in the buckets of the group activity record. This score is stored as the current score 330 in the group information record 316 for the group. In an alternate embodiment, scaling factors are not used when updating the scores in the buckets of the group activity record 334. Instead, scaling factors or weights are applied to the scores in the buckets when summing the scores to produce the current score, thereby producing a current score that is a weighted sum of the historical scores for the group.

TABLE 2

Generate Prioritized Links Procedure {
If (NewLogin or LongIdle) {
    Call ScoringFunction;
    // Next: Identify Consistently Viewed Groups //
    Identify the T groups having highest scores;
    Generate Links to the identified T groups;
    }
Identify the S groups to which User has subscribed that have the most new messages, excluding the Identified Consistently Viewed Groups;
Generate Links to the identified S groups;
}

TABLE 3

ScoringFunction {
Repeat for each Subscribed Group {
    If NewQuarter {
        B = F1 * (B + Sum(W buckets)); // F1 is a scaling factor
        between 0 and 1 //
        Clear all W buckets;
        Update the timestamp of the B bucket.
    }
    If NewWeek {
        Shift scores and timestamps for W1 thru W12 to W2 thru W13;
        Set new timestamp for W1;
        W1 = F2 * Sum(D buckets); // F2 is a scaling factor between
        0 and 1 //
        Clear all D buckets;
    }
    If NewDay {
        Shift scores and timestamps for D1 thru D6 to D2 to D7;
        Set new timestamp for D1;
        D1 = F3 * Sum(H buckets); // F3 is a scaling factor between TABLE 3-continued

```
        0 and 1 //
        Clear all H buckets;
        }
    If NewPartialDay {
        Compute Score for any data in H1;
        Shift scores and timestamps for H1 thru H7 to H2 thru H8;
        Set new timestamp for H1;
        Clear data in H1;
        If there has been new activity in Group {
            Set Activity Flag for H1}
        }
    Compute Score for Group; // e.g.. Score = sum of scores in all
    buckets //
    }
}
```

Optionally, at 510, a set of links to the groups most recently visited by the user is automatically generated. In some embodiments, link generator 220 scans the user's group information records 316 to determine the time of last visit 332 for each group, excluding records for groups to which the user has subscribed, and uses that information to generate a set of links to the groups most recently visited. In some embodiments, the links generated by link generator 220 do not exclude groups to which the user has subscribed, but do not include any of the links generated at 508.

At 512, the set of prioritized links is sent to client computer 104. If 510 has also been performed, the set of links to the groups most recently visited by the user is also sent to client computer 104. If indicia of activity have also been generated, these indicia may also sent to client computer 104. As indicated above, the indicia of activity may be embedded in the anchor text of the links sent to the client computer. In some embodiments, Navigation Region Server 102 sends the set of prioritized links, the indicia of activity, and the set of links to the groups most recently visited by the user to client computer 104 via communication network(s) 106.

At 514, client computer 104 receives the set of prioritized links and displays them in Navigation Region 402 in GUI 112.

In some embodiments, the links in Navigation Region 402 are dynamically updated by Navigation Region Server 102. For example, the prioritized set of links 404 may be updated if the user remains logged into an online groups service for a predefined period of time, such as N hours, where N may be a number between 1 and 5. The links 412 to online groups to which the user has subscribed and that have had the most activity since a last visit by the user may be updated (a) each time the user visits any of those groups, and (b) periodically if the user remains logged into the online groups service for more than a predefined period of time. Similarly, the links 406 to the groups most recently visited by the user can be updated each time the user visits a group. When a set of links are updated, the process of generating the links is repeated. If the resulting updated set of links is different than the links previously sent to the client computer, the updated links are sent to the client computer 104, which then displays them in the Navigation Region 402 (FIG. 4).

The foregoing description, for purpose of explanation, has been described with reference to specific embodiments. The embodiments were chosen and described in order to best explain the principles of the invention and its practical applications, to thereby enable others skilled in the art to best utilize the invention and various embodiments with various modifications as are suited to the particular uses contemplated. However, the illustrative discussions above are not intended to be exhaustive or to limit the invention to the precise forms disclosed. Many modifications and variations are possible in view of the above teachings.

For example, the methods, systems, and graphical user interfaces described could also be used to automatically personalize and prioritize links to all websites (or URLs) visited by a computer user. In some embodiments, group information records 316 become website information records, group activity record 334 becomes a website activity record, and group ID 326 becomes the URL of the website (or a fingerprint of the URL). In some embodiments, the last message read 328 is not used. In some embodiments, links generator 218 uses website activity records 334 to calculate a score 330 for each website represented by a website information record 316 for user x. In some embodiments, a score 330 is generated only for those websites to which the user has subscribed. Score 330 for a website will be higher if the user consistently visits that website. Conversely, score 330 for a website will be lower if the user rarely visits that website. In some embodiments, the score 330 is generated using a scoring function that weights recent user visits more heavily than user visits further in the past. In other embodiments, the scoring function may take both user visits to websites and website activity into account.

For this example, Navigation Region 402 displays personal, prioritized links 404 to websites. Prioritized links 404 are personal because they are based, at least in part, on the particular computer user's browsing habits with respect to the websites. In some embodiments, prioritized links 404 are automatically generated by and received from Navigation Region Server 102. In other embodiments, Navigation Region Engine 214 resides in client 104 so that prioritized links 404 are automatically generated locally at client 104. In one embodiment, Navigation Region 402 also displays links 406 to websites most recently visited by the user. In some embodiments, the links 406 to recently visited websites do not include any of the links in the prioritized links 404.

What is claimed is:

1. A computer implemented method comprising:
at a server system having one or more processors and memory storing programs executed by the one or more processors:
automatically generating first and second sets of prioritized links to online groups based at least in part on a user's browsing patterns with respect to online groups to which said user has subscribed and based at least in part on new activity by users other than said user with respect to said online groups to which said user has subscribed since a respective last visit by said user to the online groups, the new activity comprising one or more new postings by users other than said user, wherein:
the first set of automatically generated prioritized links includes links to online groups most consistently visited by the user; and
the second set of automatically generated prioritized links includes links to online groups that have had the most new activity by users other than said user since a respective last visit by said user to the online groups;
automatically generating indicia of a quantity of new activity since the respective last visit by said user for at least some of said online groups, the quantity of new activity comprising a number of new postings by users other than said user;
automatically generating a set of links to online groups most recently visited by said user;

sending said first and second sets of prioritized links, said indicia, and said set of links to online groups most recently visited by said user to a client computer for concurrent display in a graphical user interface, said first and second sets of prioritized links and set of links to online groups to be concurrently displayed in three separate regions of the graphical user interface; and updating said first and second sets of prioritized links and said indicia as said user views content from a plurality of online groups, wherein said browsing patterns with respect to online groups include said user's browsing behavior after new activity by users other than said user is indicated for at least some of said online groups.

2. A system comprising at least one server, said at least one server comprising memory, one or more processors, and one or more programs stored in the memory and configured for execution by the one or more processors, the one or more programs including instructions to:

automatically generate first and second sets of prioritized links to online groups based at least in part on a user's browsing patterns with respect to online groups to which said user has subscribed and based at least in part on new activity by users other than said user since a respective last visit by said user to the online groups, the new activity comprising one or more new postings by users other than said user, wherein:

the first set of automatically generated prioritized links includes links to online groups most consistently visited by the user; and the second set of automatically generated prioritized links includes links to online groups that have had the most new activity by users other than said user since a respective last visit by said user to the online groups;

automatically generate indicia of a quantity of new activity since the respective last visit by said user for at least some of said online groups, the quantity of new activity comprising a number of new postings by users other than said user;

automatically generate a set of links to online groups most recently visited by said user;

send said first and second sets of prioritized links, said indicia, and said set of links to online groups most recently visited by said user to a client computer for concurrent display in separate regions of a graphical user interface, said first and second sets of prioritized links and set of links to online groups to be concurrently displayed in three separate regions of the graphical user interface; and update said first and second sets of prioritized links and said indicia as said user views content from a plurality of online groups, wherein said browsing patterns with respect to online groups include said user's browsing behavior after new activity by users other than said user is indicated for at least some of said online groups.

3. A non-transitory computer readable storage medium storing one or more programs having instructions that when executed by one or more processors of a computer system cause the computer system to:

automatically generate first and second sets of prioritized links to online groups based at least in part on a user's browsing patterns with respect to online groups to which said user has subscribed and based at least in part on new activity by users other than said user since a respective last visit by said user to the online groups, the new activity comprising one or more new postings by users other than said user, wherein:

the first set of automatically generated prioritized links includes links to online groups most consistently visited by the user; and the second set of automatically generated prioritized links includes links to online groups that have had the most new activity by users other than said user since a respective last visit by said user to the online groups;

automatically generate indicia of a quantity of new activity since the respective last visit by said user for at least some of said online groups, the quantity of new activity comprising a number of new postings by users other than said user;

automatically generate a set of links to online groups most recently visited by said user;

send said first and second sets of prioritized links, said indicia, and said set of links to online groups most recently visited by said user to a client computer for concurrent display in separate regions of a graphical user interface, said first and second sets of prioritized links and set of links to online groups to be concurrently displayed in three separate regions of the graphical user interface; and update said first and second sets of prioritized links and said indicia as said user views content from a plurality of online groups, wherein said browsing patterns with respect to online groups include said user's browsing behavior after new activity by users other than said user is indicated for at least some of said online groups.

4. The method of claim 1, wherein the indicia include numbers in parentheses to indicate the numbers of new postings to the respective online groups.

5. The method of claim 1, wherein the indicia include non-numeric symbols.

6. The method of claim 1, wherein the second set of prioritized links does not include links to the groups for which links are included in the first set of prioritized links.

7. The system of claim 2, wherein the indicia include numbers in parentheses to indicate the numbers of new postings to the respective online groups.

8. The system of claim 2, wherein the indicia include non-numeric symbols.

9. The system of claim 2, wherein the second set of prioritized links does not include links to the groups for which links are included in the first set of prioritized links.

10. The non-transitory computer readable storage medium of claim 3, wherein the indicia include numbers in parentheses to indicate the numbers of new postings to the respective online groups.

11. The non-transitory computer readable storage medium of claim 3, wherein the indicia include non-numeric symbols.

12. The non-transitory computer readable storage medium of claim 3, wherein the second set of prioritized links does not include links to the groups for which links are included in the first set of prioritized links.

* * * * *